United States Patent [19]
Dorfman et al.

[11] Patent Number: 6,134,313
[45] Date of Patent: Oct. 17, 2000

[54] SOFTWARE ARCHITECTURE FOR A COMPUTER TELEPHONY SYSTEM

[75] Inventors: Alexander Dorfman, Brea; Michael Thomas Elliott, Mission Viejo; Hao-Yang Feng, Gardena; Kelly Khanh Bui, Irvine; Jeffrey Wayne Pence, Fullerton, all of Calif.

[73] Assignee: Toshiba America Information Systems, Inc., Irvine, Calif.

[21] Appl. No.: 09/221,188

[22] Filed: Dec. 23, 1998

Related U.S. Application Data

[63] Continuation-in-part of application No. 09/177,407, Oct. 23, 1998.

[51] Int. Cl.$^7$ .................................................... H04M 3/42
[52] U.S. Cl. ...................... 379/201; 379/88.22; 379/242
[58] Field of Search ............................ 379/67.1, 88.13, 379/88.16, 88.22, 90.01, 201, 242, 265, 266; 395/800.01, 800.28

[56] References Cited

U.S. PATENT DOCUMENTS

| | | |
|---|---|---|
| 5,452,341 | 9/1995 | Sattar . |
| 5,455,854 | 10/1995 | Dilts et al. .............................. 379/201 |
| 5,455,903 | 10/1995 | Jolissaint et al. . |
| 5,488,650 | 1/1996 | Greco et al. . |
| 5,644,631 | 7/1997 | Sattar et al. . |
| 5,717,747 | 2/1998 | Boyle, III et al. ...................... 379/201 |
| 5,724,406 | 3/1998 | Juster . |
| 5,737,393 | 4/1998 | Wolf . |
| 5,787,300 | 7/1998 | Wijaya . |
| 5,898,772 | 5/1999 | Connors et al. ........................ 379/265 |
| 5,917,903 | 7/1999 | Jolissaint ................................ 379/265 |

OTHER PUBLICATIONS

"An Architectural Approach To Mimimizing Feature Interactions In Telecommunications" by Zibman et al., IEEE/ACM Transactions On Networking, vol. 4, No. 4, Aug. 1996, pp. 582–595.

*Primary Examiner*—Scott L. Weaver
*Attorney, Agent, or Firm*—Morrison & Foerster

[57] ABSTRACT

A software architecture for a computer telephony server for simultaneously implementing a plurality of messaging applications is provided. The server includes a processor, a memory and a plurality of slots connected to the processor through a high-speed bus, each of the plurality of slots being adapted to receive an interface card for connecting the server to an external resource. The server further includes a session having a thread of execution on the processor and controlling a subset of the memory and a telephone line resource. The call processing behavior of the session is defined by a first user agent which represent a known user of the server. The first user agent includes a first scenario and a first set of properties. The first scenario includes a plurality of event-application pairs, each pair representing a valid event and a corresponding application that is executed when the valid event is detected. The first set of properties includes fixed properties for customizing standard features of the first user agent and named properties for customizing the behavior of the applications from the first scenario. The first scenario and the first set of properties can be altered during runtime of the server, thereby allowing the call processing behavior of the server to be changed. The software architecture also supports the inheritance of user agent features from a parent user agent to a child user agent such that changes made to the parent user agent are immediately inherited by the child user agent during runtime.

22 Claims, 16 Drawing Sheets

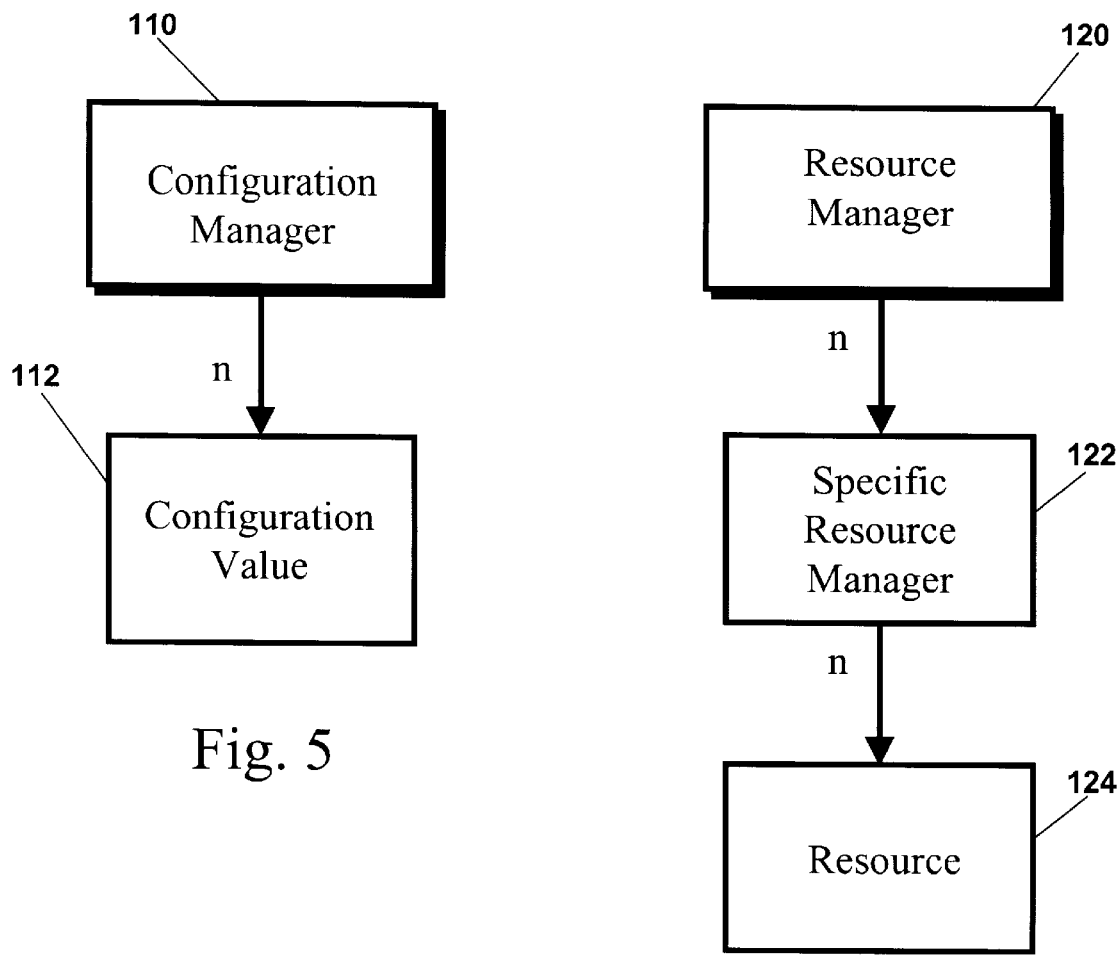
Fig. 5
Fig. 6
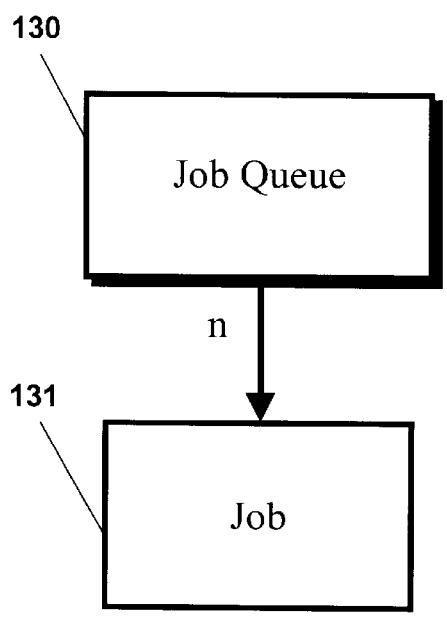
Fig. 7

SOFTWARE ARCHITECTURE FOR A COMPUTER TELEPHONY SYSTEM

RELATED APPLICATION

The present application is a continuation-in-part of copending application Ser. No. 09/177,407, filed Oct. 23, 1998, entitled COMPUTER TELEPHONY SYSTEM AND METHOD.

BACKGROUND OF THE INVENTION

1. Field of the Invention

The present invention relates to computer telephony systems and methods, and more particularly to an extendable, open and flexible software architecture for a computer telephony server that provides an easily customizable call processing environment.

2. Description of the Related Art

Computer telephony systems, i.e., systems that integrate computers and telephones, are widely used in the art. By combining the power of computers with telephones and messaging services, computer telephony systems have become powerful business tools. The computer telephony systems known in the art are capable of combining voice messaging, facsimile messaging, paging, electronic mail, and other messaging services, through implementations such as interactive voice response systems and unified messaging.

Recently, there have been rapid advances in computer hardware, software and communications systems. As a result, businesses relying on computer telephony systems are confronted with choosing between expensive upgrades in hardware and software or losing a competitive advantage. In addition, businesses also require a computer telephony system that can be easily customized to meet their business needs. Thus, there is a need in the art for a computer telephony system that is extendible, open and flexible. A computer telephony system would be extendible and open if new applications and hardware resources could be added without requiring major modifications of the computer telephony system, including adding new hardware and rewriting software. A flexible computer telephony system would be compatible with multiple hardware platforms and be easily customizable, allowing the computer telephony system to serve various business needs.

SUMMARY OF THE INVENTION

The present invention is directed to a computer telephony system and method that is extendible, open and flexible. In one embodiment, a software architecture for a computer telephony server operates to provide a call processing environment that is easily customizable, even during runtime.

The computer telephony server, capable of simultaneously implementing a plurality of messaging applications, includes a processor, a memory, and a plurality of slots connected to the processor through a high-speed bus. Each of the plurality of slots is adapted to receive an interface card for connecting the computer telephony server to an external resource—such as a telephone line resource. A software architecture operating on the computer telephony server includes a multitasking operating system for controlling the server, a plurality of device drivers for interfacing the external resources with the multi-tasking operating system, and an event-driven, object-oriented application framework running on the multitasking operating system. The application framework includes a plurality of global objects, including a configuration manager for setting system wide properties, an internal database manager and a resource manager for allocating the physical resources of the server.

In one embodiment, the software architecture further includes a session and a first user agent. The session includes a thread of execution on the processor, controls a subset of the memory and at least one telephone line resource, and is adapted to detect a call processing event relating to the telephone line resource. The first user agent represents a known user of the computer telephony server and includes a first scenario and a first set of properties. The first scenario includes a plurality of event-application pairs, with each pair representing a valid event and a corresponding application that is executed when the valid event is detected. The first set of properties includes fixes properties for customizing standard features of the first user agent and named properties for customizing the behavior of the applications from the first scenario. The named properties include name-value pair, with each pair representing the name of an environmental variable utilized by at least one application in the first scenario, and its associated value.

The first user agent is implemented on the session and defines the call processing behavior of the session in accordance with the event-application pairs of the first scenario and the first set of properties. The first scenario and the first set of properties can be altered during runtime of the computer telephony server, thereby allowing the call processing behavior of the computer telephony server to be changed at virtually any time. In fact, new applications may be added during runtime merely by adding an event-application pair to first scenario.

In addition, the computer telephony server may also include a parent user agent. The parent user agent represents a group of users of the computer telephony server and includes a parent scenario defining a default call processing behavior for the group of users, and a parent set of properties including default values to customize the call processing behavior defined by the parent scenario for the group of users. The parent scenario and the parent set of properties are inheritable by at least one child user agent, which represents a known user of the computer telephony server. A child user agent is permitted to override features of the parent user agent, including individual event-application pairs from the parent scenario and individual name-value pairs from the parent set of properties. When a change is made to the parent scenario or parent set of properties, the changes are immediately inherited by the child user agent during runtime. The first user agent may be a child user agent. The computer telephony server also supports a multi-level hierarchy.

In another embodiment, the computer telephony server may further include a second user agent having a second scenario and a second set of properties. The first scenario could include a transfer event-application pair such that, when the transfer event is detected in the session, the transfer application is executed and implements the second user agent on the session in place of the first user agent.

The first user agent may also include a message box for storing a plurality of messages associated with the first user agent. Each of the messages includes a message header and at least one message component. The message components may be a voice mail message, an e-mail message, a fax message, or any other type of message supported by the computer telephony server.

The present invention also includes a method for operating a computer telephony system that has a computer with a processor and a memory and at least one telephone line resource. A first user agent is created including a first scenario having a first plurality of event-application pairs defining a first call processing behavior of the first user agent and a first set of properties for customizing the call processing behavior defined by the first scenario. Next, a session is created, including a thread of execution on the processor and controlling a subset of the memory and that at least one telephone line resource. The first user agent is then implemented on the session in a manner such that the first user agent defines the event-driven call processing behavior of the session. When a call processing even is detected on the session, the first scenario is searched to locate each event-application pair that has an event corresponding to the detected event. If the detected event is found, the corresponding applications are executed.

In one embodiment, the method of the present invention also includes the steps of creating a parent user agent and configuring the first scenario. The parent user agent includes a parent scenario having a parent plurality of event-application pairs defining a parent call processing behavior and a parent set of properties, wherein the first user agent inherits the parent scenario and the parent set of properties. The first scenario and the first set of properties are then configured to override certain of the parent plurality of event-application pairs and certain of the parent set of properties, such that the call processing behavior defined by the first user agent differs from the call processing behavior defined by the parent user agent.

In another embodiment of the method of the present invention, a second user agent may be implemented on the session in place of the first user agent. In this embodiment, the first plurality of event-application pairs includes a transfer event and a corresponding transfer application. The step of creating also includes creating the second user agent including a second scenario having a second plurality of event-application pairs defining a second call processing behavior and a second set of properties. When the transfer event is detected, the transfer application is executed on the session and operates to implement the second user agent on the session in place of the first user agent.

A more complete understanding of the Software Architecture for a Computer Telephony System will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 5 is a diagram illustrating a configuration manager global object of a preferred embodiment;

FIG. 6 is a diagram illustrating a resource manager global object of a preferred embodiment;

FIG. 7 is a diagram illustrating a job queue global object of a preferred embodiment;

DETAILED DESCRIPTION OF PREFERRED EMBODIMENTS

In the detailed description that follows, it should be appreciated that like element numerals are used to describe like elements that are illustrated in one or more of the figures.

Figure 1:
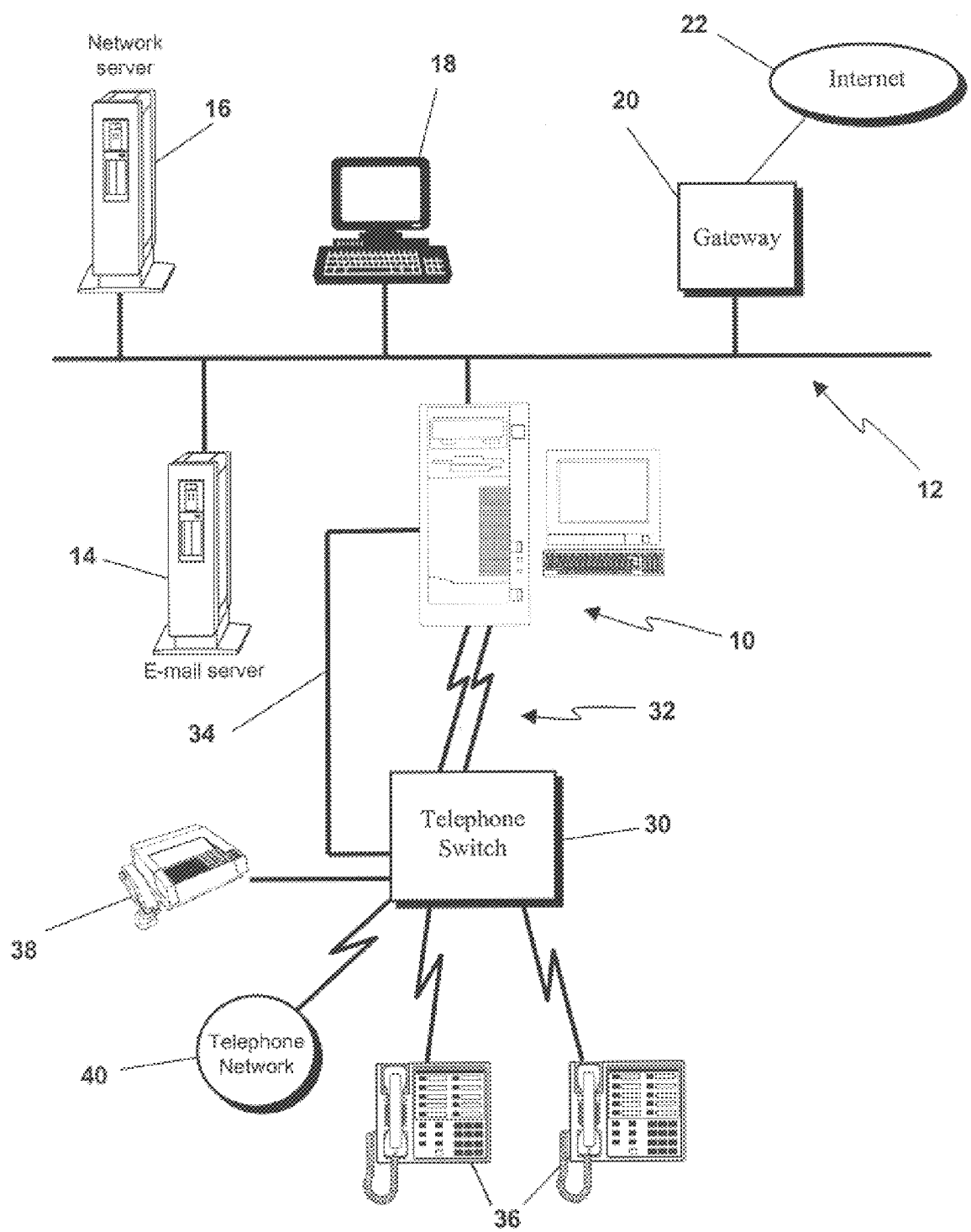
FIG. 1 illustrates a computer telephony system of a preferred embodiment of the present invention.

A computer telephony server (CT server) in accordance with a preferred embodiment of the present invention will now be described with reference to FIG. 1. A CT server 10 is connected to a local area network (LAN) 12, allowing the CT server 10 to communicate with other devices connected to the LAN 12, including an electronic mail server 14 (e-mail server), a network server 16, a workstation 18, and a gateway 20 for providing access to a remote network 22 such as the Internet 22. In the preferred embodiment, the LAN 12 is an Ethernet network; however, other network protocols can also be utilized. It should also be appreciated by those having ordinary skill in the art that additional devices can be connected to the LAN 12, and that the LAN 12 does not necessarily include all of the devices illustrated in FIG. 1.

The CT server 10 is also connected to a telephone switch 30. In the preferred embodiment, the telephone switch 30 is a private branch exchange (PBX), but the telephone switch 30 can also be a key telephone system, public switched telephone network or other telephone systems known in the art. As known in the art, a PBX is a telephone switching system that interconnects telephone extensions to each other, as well as to an outside telephone network. The telephone switch 30 is adapted to perform a plurality of functions including least-cost routing for outside calls, call forwarding, and conference calling. In a preferred embodiment, the telephone switch 30 is connected to the CT server 10 through phone connections 32 and a Simplified Message Desk Interface (SMDI) serial link 34. The phone connections 32 provide telephone services between the CT server 10 and the PBX 32. In the preferred embodiment, the phone connections 32 are analog phone lines, but digital lines can also be used. The SMDI serial link 34 provides a high-speed communications link between the CT server 10 and the telephone switch 30. The telephone switch 30 can also be connected to a plurality of phones 36, fax machines 38 and other telephone networks 40.

Figure 2:
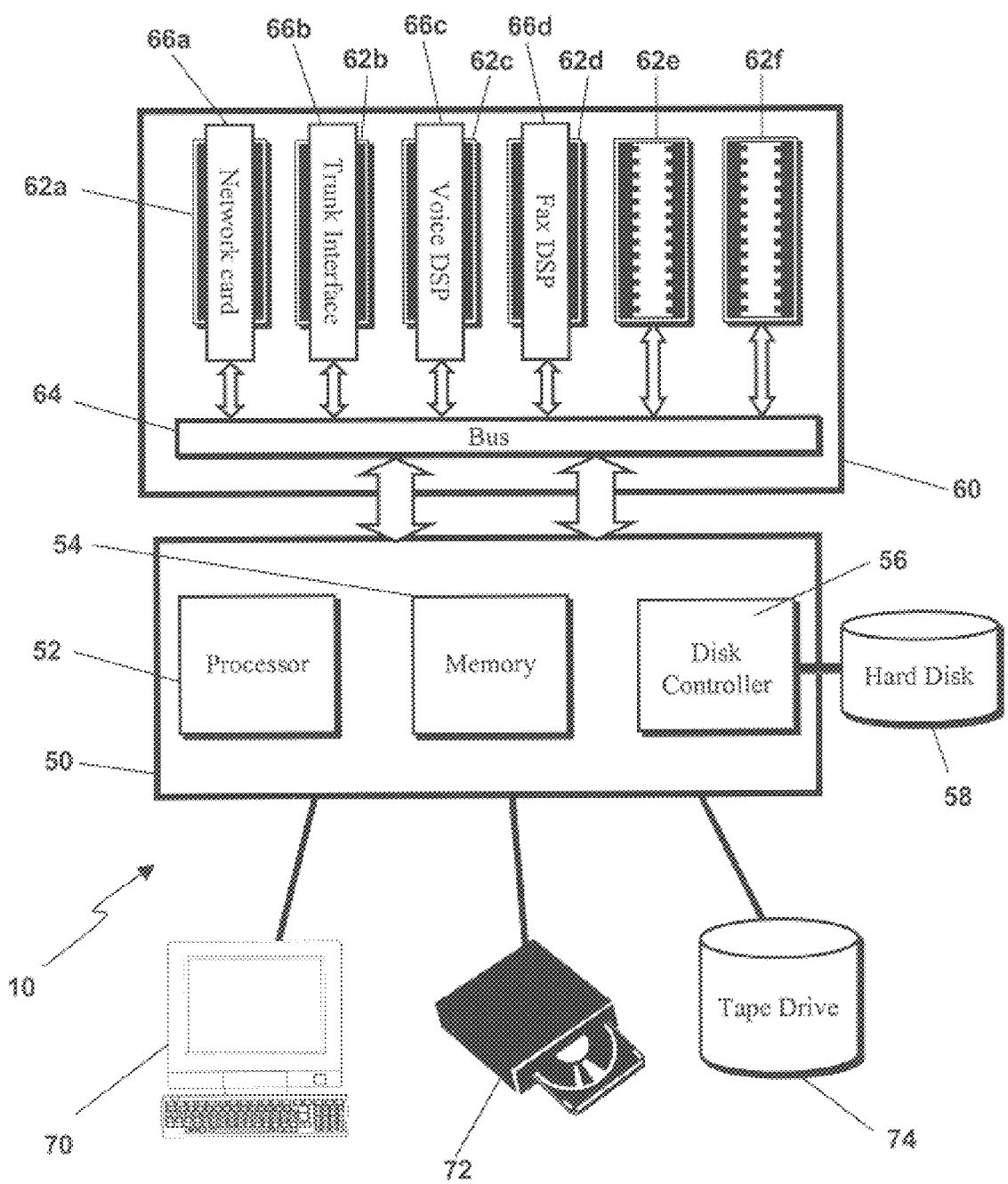
FIG. 2 is a block diagram illustrating the hardware components of a preferred embodiment of a computer telephony server.

A preferred embodiment of the CT server 10 hardware will now be described with reference to FIG. 2. The CT server 10 includes a processor board 50 and a backplane 60. The processor board 50 is a Single Board Computer (SBC) which includes a processor 52, a memory 54 and a disk controller 56 which is coupled to a hard drive 58. In a preferred embodiment, the processor 52 is a Pentium or Pentium compatible processor; however, other processors may also be utilized. The memory 54 includes a ROM and at least 32 Mb of RAM. The disk controller 56 controls the hard drive 58, preferably based on an IDE interface, which is utilized for storing data such as voice mail messages. The processor board 50 is connected to a plurality of devices, including a terminal 70 to allow administration of the CT server 10, a CD-ROM 72 and a tape drive 74 for providing backup storage for the CT server 10.

The backplane 60 includes a plurality of slots 62a–f, which are connected to a bus 64. In a preferred embodiment, the plurality of slots 62a–f are Industry Standard Architecture (ISA) slots and are adapted to accept ISA plug-in boards such as a network card 66a for interfacing the CT server 10 with the LAN 12, a trunk interface 66b for interfacing the phone connections 32 between telephone switch 30 and the CT server 10, a voice digital signal processor (DSP) 66c and a fax DSP 66d. Alternatively, the slots 62a–f may be Peripheral Component Interconnect (PCI) slots for connecting PCI cards, or utilize other interface standards as known in the art.

The processor board 50 is adapted to be received into a slot (not shown) on the backplane 60, thereby connecting the processor board 50 to the backplane 60. When connected, the processor board 50 communicates with the installed devices in slots 62a–62f through a bus 64. In a preferred embodiment, the bus 64 is a high-speed Signal Computing bus (SCbus), which provides a 131 Mbps data path having up to 2,048 time slots, the equivalent of 1,024 two-way voice conversations at 64 Kbps. However, other bus standards may also be implemented, such as standards from the Enterprise Computer Telephony Forum (ECTF) or H.110 from the Consultative Committee on International Telephone and Telegraph (CCITT).

Processor boards and backplanes, such as processor board 50 and backplane 60 described above, are known in the art and are available from companies such as Dialogic Corporation, Parsippany, N.J. In addition, it should be appreciated that other hardware configurations could be utilized. For example, the backplane 60 of the preferred embodiment is a passive backplane, but the CT server 10 could also be implemented with an active backplane. However, as known in the art, the utilization of passive backplanes and single board computers facilitates an open, modular hardware platform.

Figure 3:
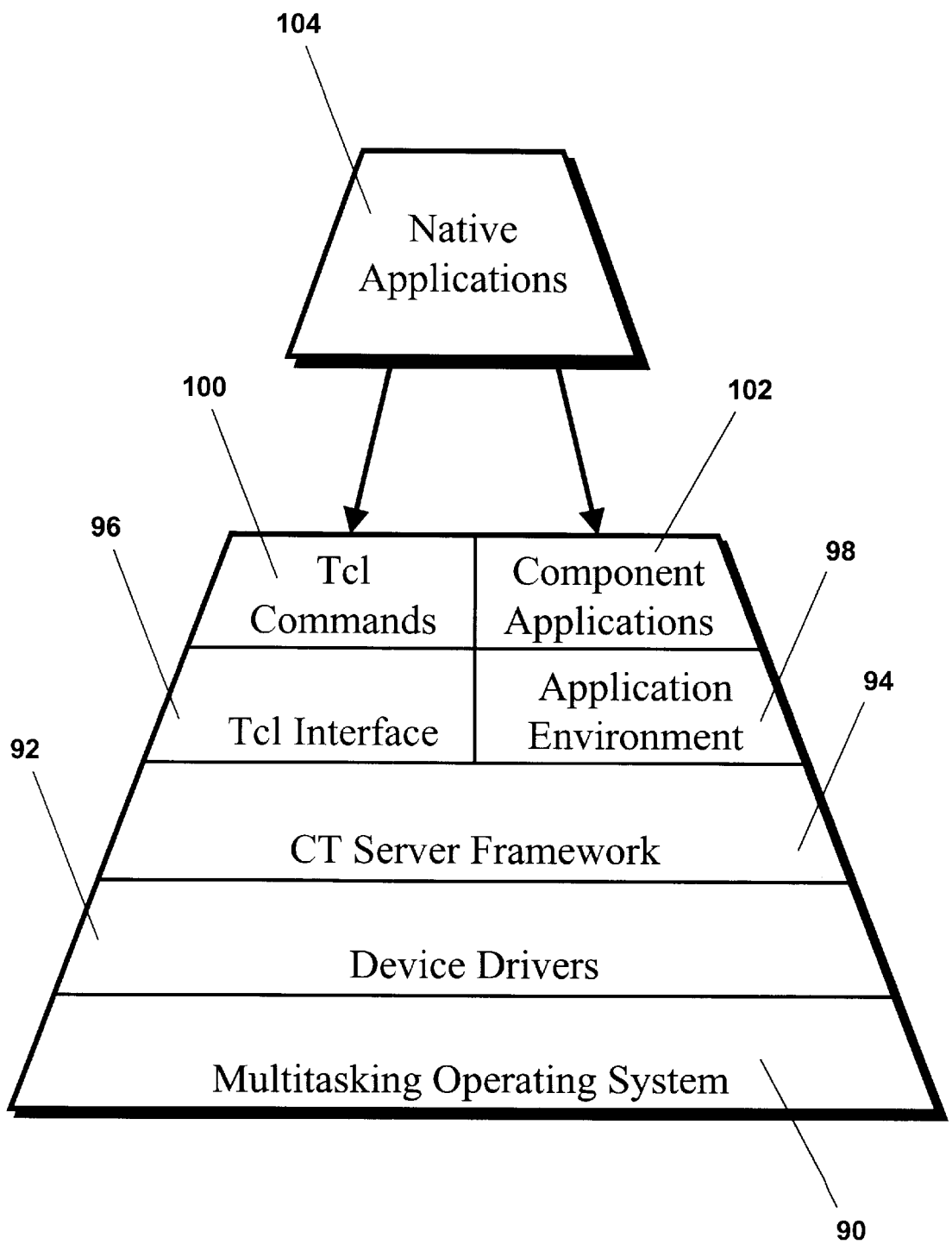
FIG. 3 illustrates a software architecture hierarchy of a computer telephony server of a preferred embodiment.

A preferred embodiment of the CT server 10 software will now be described with reference to FIG. 3. At the lowest level, the CT server 10 runs a multitasking operating system 90, such as Windows NT by Microsoft Corp. Windows NT is a 32-bit operating system that includes features such as peer-to-peer networking, preemptive multitasking, multithreading, multiprocessing and fault tolerance. It should be apparent that other multitasking operating systems, such as UNIX, can of course be utilized. A second level of software, running on the operating system 90, includes device drivers 92. Generally, the device drivers 92 are provided by the manufacturer of individual hardware devices and are utilized to link the hardware devices to the operating system 90.

A third level of software is a CT server framework 94. The CT server framework 94 is an event-driven, object-oriented software environment used for the development and operation of server-based CT Integration applications such as voice mail and interactive voice response (IVR) systems. As will be appreciated by those having ordinary skill in the art, the CT server framework 94 is a unique application interface and infrastructure for the development of these CT server applications, providing extendibility, openness, robustness and flexibility. A more detailed discussion of the CT server framework 94 will be provided below.

A fourth level of software includes a Tool Command Language (Tcl) interface 96 and an application environment 98. As known in the art, Tcl is an interpreted script language that is used to develop applications, and provides an interface into applications that are compiled with Tcl functions. The Tcl interface 96 provides an environment to execute Tcl scripts. It should be apparent that other scripting languages and interfaces can of course be utilized. The application environment 98 provides a setting for executing compiled component applications, and provides a mechanism to allow new component applications to be added without requiring modifications to the main executable. As known in the art, Windows NT provides a software architecture called Component Object Model (COM) which allows applications to be built from separate binary components. In particular, COM provides a mechanism to construct and register objects dynamically, thus eliminating the need for statically linking with object code. The application environment 98 will locate new objects from a registry and load them into the executable's environment as needed.

A fifth level of software includes Tcl commands 100 and component applications 102. The Tcl commands 100 include script commands for performing basic system functions including: (a) play a message; (b) record a message; (c) open database; etc. The component applications 102 include compiled applications for performing various call processing functions. The sixth level of software includes native applications 104, which group one or more Tcl commands 100 and/or component applications 102 to perform large scale CT applications, including call processing, integrated messaging and IVR applications. As will be discussed in detail below, the CT server 10 provides a structure and an environment that allows for efficient creation, use and modification of native applications 104, through Tcl scripts and event-application maps.

CT Server Framework

Figure 4:
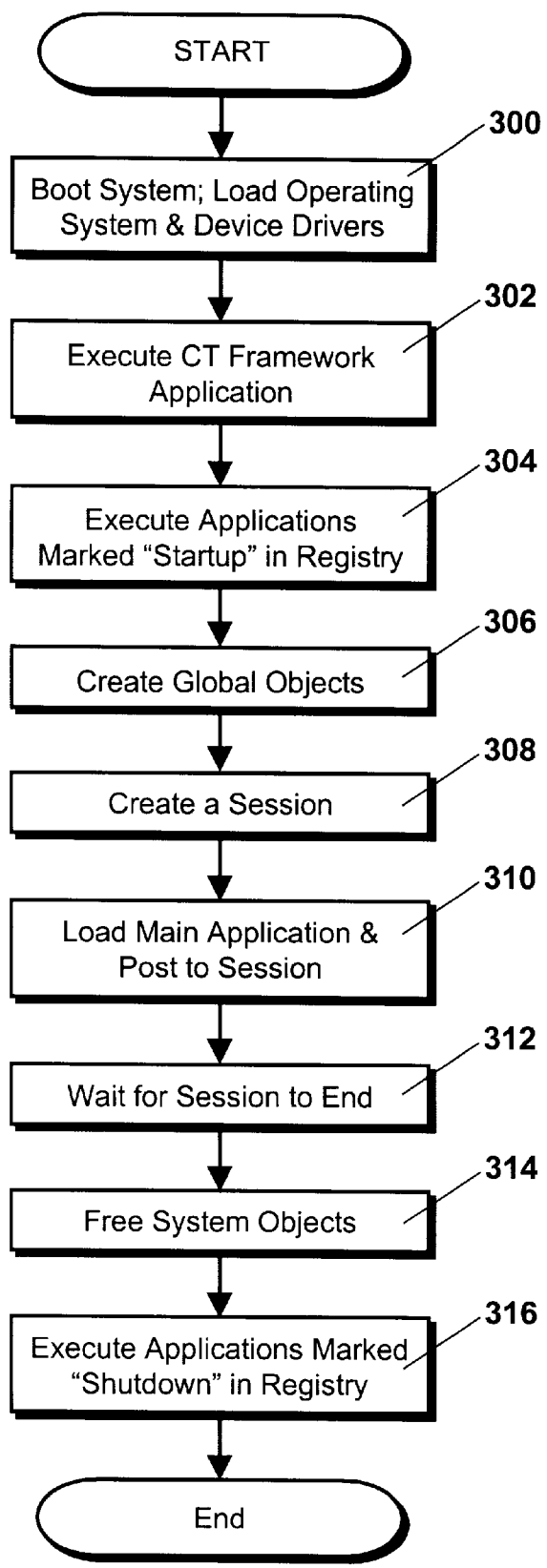
FIG. 4 is a flow diagram illustrating the operation of a preferred embodiment of a computer telephony server.

A preferred embodiment of the operation of the CT server 10 and the framework 94 will now be described with reference to the flow diagram of FIG. 4. First, at Step 300 the CT server 10 boots, loading the multitasking operating system 90 and then the device drivers 92. At Step 302, a CT framework application is started. The CT framework application can be executed automatically when the system boots; however, in the preferred embodiment, a Services Control Panel Applet is first executed and provides the user with an option menu, including the option of executing the CT framework application. The CT framework application executes all applications marked "startup" in the registry at Step 304. The registry is a database including configuration settings, and in the preferred embodiment, is part of Windows NT. As known in the art, information is stored in the registry that controls Windows itself, and application programs (such as the CT framework application) can store their own settings in the registry. The "startup" settings for the CT framework application includes programs for checking the integrity of internal databases and verifying the reasonableness of various configurations.

Next, at Step 306 the CT framework application creates global system objects including a configuration manager 110, a resource manager 120, a job queue 130 and a database manager 140 (see FIGS. 5–11). Additional global objects may also be created, for example, a scheduler object can be created to execute scheduled applications at a certain date and time, and a plurality of event objects may be created including a shut-down event for terminating the execution of the CT server framework 94. In the preferred embodiment, all global system objects are retrieved from a global, read-only data structure that is provided with a set of macros for manipulating the data.

As illustrated in FIG. 5, the configuration manager 110 is a global object that includes a plurality of configuration values 112. The configuration values 112 maintain global system information that is used for setting system wide properties (e.g., timeout values) and generic properties and values (e.g., establishing a protocol between the CT server 10 and the telephone switch 30). The configuration manager 110 also provides additional services such as application allocation, Tcl command registration and Tcl interpreter creation.

As illustrated in FIG. 6, the resource manager 120 is a global object that manages the physical resources of the CT server 10. The resource manager 120 includes a set of specific resource managers 122, each of which manages a set of specific resources 124. For example, the CT server 10 may include telephone line resources and fax resources. A telephone line resource manager would regulate the use of each telephone line connected to the CT server 10, while a fax resource manager would regulate the use of each fax device connected to the CT server 10. In a preferred embodiment, a request to use a specific resource will be made through the global resource manager 120, which in turn, communicates directly with the relevant specific resource manager 124.

As illustrated in FIG. 7, the job queue 130 is a global object that includes a set of jobs that are waiting to be executed. In the preferred embodiment, the job queue 130 works with the resource manager 120 and is used to support asynchronous applications that require a CT resource. For example, if a user has programmed the system to place an outgoing call to his home whenever a message is left in his mailbox, a job will be created and submitted to the job queue 130 for execution when a message is received. Before executing the job, the job queue 130 will request an idle line from the resource manager 120 on which to place the outgoing call. If a line is available, the job queue 130 creates a session to run the task and to take control of the line. As will be discussed in greater detail below, the session defines a call processing environment that includes a thread of control on the processor 52 and a subset of the memory 54. When the job is finished, the line is returned to an idle state, and the resource manager 120 is notified that the line is once again available. Other waiting jobs in the job queue 130 may then be executed on that line.

Figure 8:
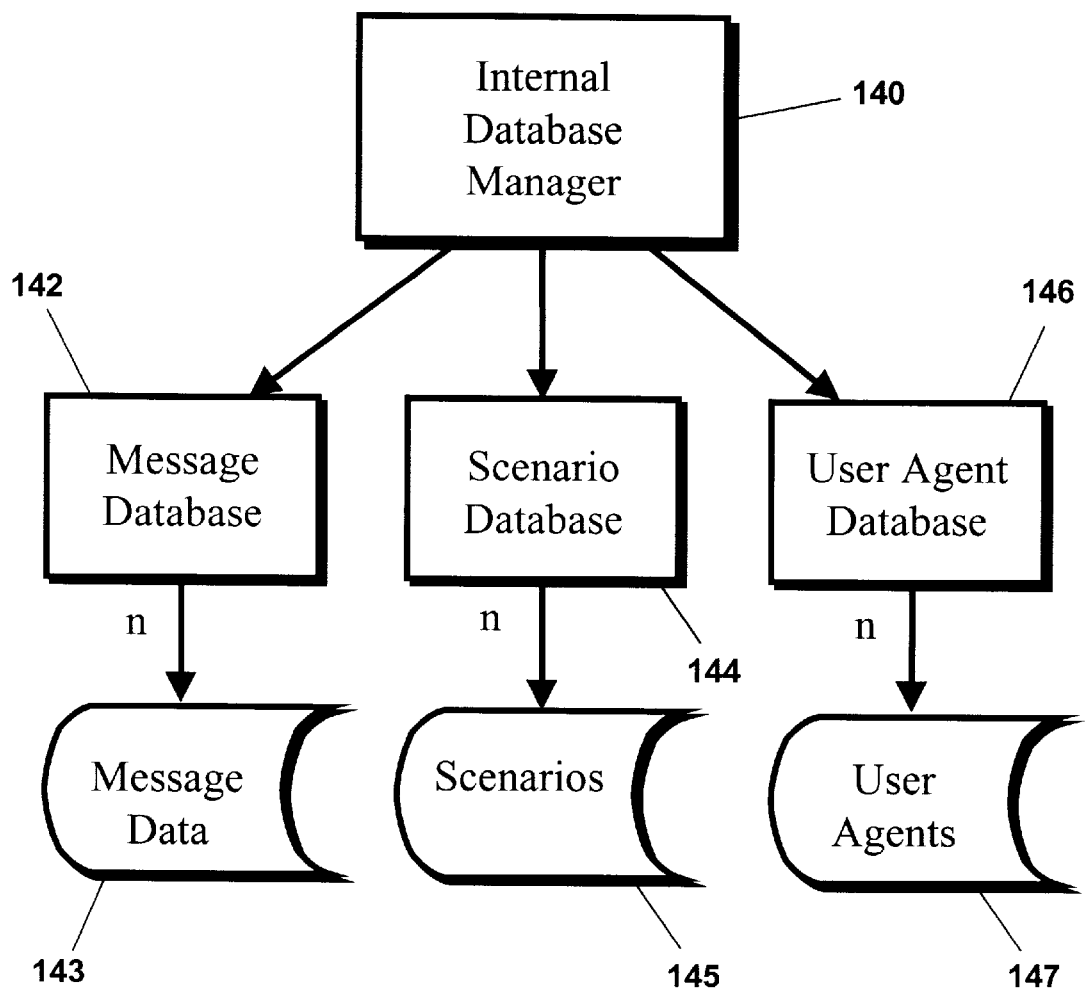
FIG. 8 is a diagram illustrating an internal database manager global object of a preferred embodiment.

The internal database manager 140, illustrated in FIG. 8, is a global object that controls databases utilized by the CT server 10, including a message database 142, a scenario database 144, and a user agent database 146. In the preferred embodiment, the databases are represented as a set of two-dimensional tables, each having an index key. The indexes are stored in hash tables that are built during system startup. The internal database manager 140 provides full multithreading access to the data within a single process with minimal overhead. In the preferred embodiment, only one instance of the internal database manager 140 is present on the system. Other components gain access to the internal database manager 140 through a pointer, also stored as a global object.

The message database 142 includes a plurality of messages 143. Each message 143 includes a message header and may have a message body with one or more components including voice data, fax data, and arbitrary binary data. The message header includes information specific to the message's target user. In a preferred embodiment, components can be shared across different messages and message bodies can be shared across different users.

Figure 9:
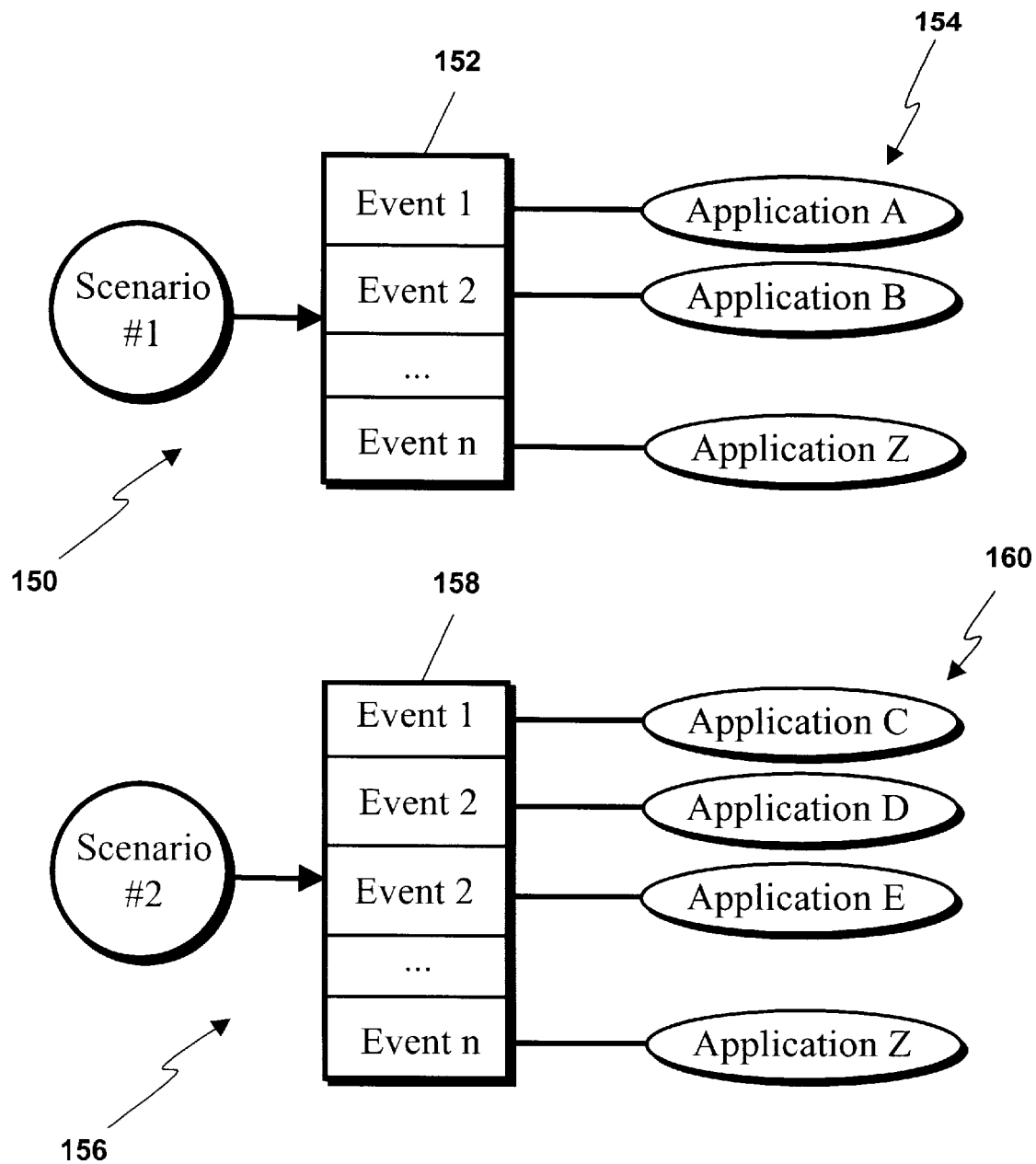
FIG. 9 is a diagram illustrating scenarios of a preferred embodiment.

The scenario database 144 includes data for a plurality of scenarios 145. A scenario 145 is an ordered collection of event maps, mapping each event in the scenario to at least one application identifier. As illustrated in FIG. 9, the same event may be mapped to different applications in different scenarios. A first scenario 150 includes a list of events 152, each of which is mapped to one of a plurality of applications 154. If the first scenario 150 is utilized, on the occurrence of "Event 1," "Application A" will be executed. A second scenario 156 includes a list of events 158, each of which is mapped to one of a plurality of applications 160. As illustrated, if the second scenario 156 is utilized, on the occurrence of "Event 1," "Application C" will be executed. It should be noted that the list of events 158 may be different than the list of events 152. Also, each event map may include one or more parameters to further customize the behavior of the corresponding application.

The second scenario 156 also illustrates that a single event (i.e., Event 2) may be mapped to more than one application. For example, in a voice mail system, a new voice mail message (i.e., a message that is created and added to a mailbox) may trigger a "new message event," which is mapped to more than one application designed to notify the mailbox owner of the presence of the new message. One notify application may turn on a message light indicator on the telephone extension associated with the mailbox, while another notify application may send a message to the mailbox owner's pager. As should be apparent, the use of scenarios allows the overall system to have different behaviors, based upon the configuration of the scenario currently being used.

In a preferred embodiment, two types of scenarios 145 are supported: system scenarios and user scenarios. Only one system scenario is utilized on a CT server 10 at a time, and it defines the default behavior of the system. As will be discussed below, user scenarios are defined for individual user agents. In addition, it is preferred that each scenario 145 also have a scheduling record that is capable of making a given event map active or inactive based on a current date/time. For example, the CT server 10 can be utilized by a business that operates between 9 a.m. and 5 p.m. During these business hours, a "new call" event (i.e., a call from an outside line) may be mapped to an application that forwards the call to an operator. However, outside of business hours, it may be beneficial to have this "new call" event mapped to an auto attendant application.

User Agents

Figure 10A:
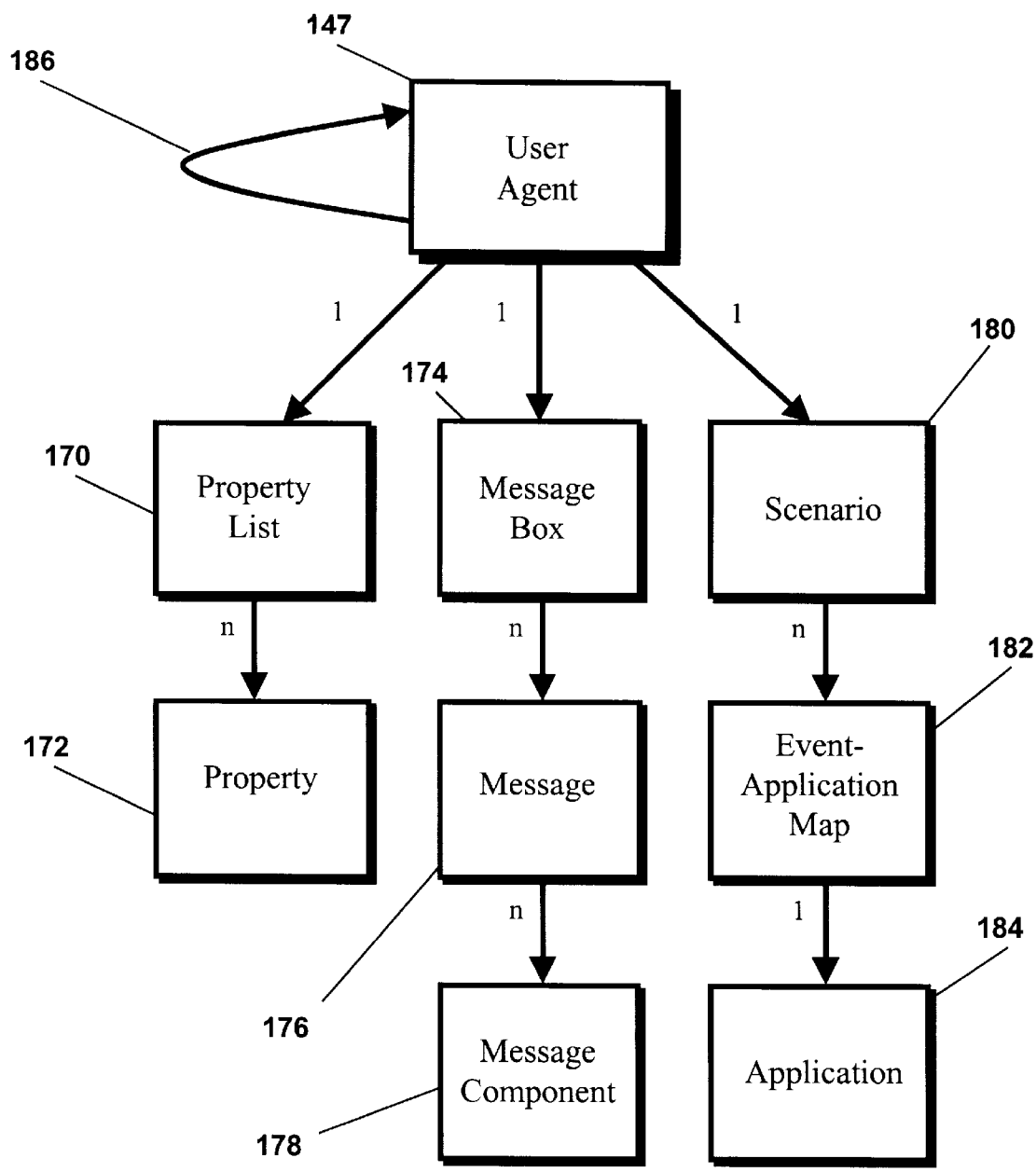
FIG. 10a illustrates a preferred embodiment of a user agent.

The user agent database 146 includes data for a plurality of user agents 147. Each user agent 147 represents a known user of the CT server 10, for example, a voice mail box. As illustrated in FIG. 10a, in a preferred embodiment each user agent 147 includes a property list 170, a message box 174 and a scenario 180. The scenario 180 is a user scenario, and includes a plurality of event-application maps 182, each of which maps an event to one application 184. In a preferred embodiment, the user agent 147 may only subscribe to one scenario 180, with the scenario 180 automatically inheriting the event-maps of the system scenario.

The property list 170 includes a set of properties 172 that are used to configure the user agent 147. The set of properties 172 include fixed properties and named properties. Fixed properties include required user agent information that is configurable for a given user agent, such as a security access code, security attributes, a scenario ID and a user agent ID. In a preferred embodiment, the fixed properties are stored in the user agent database 146 while the named properties are stored in the registry of the operating system. It should be appreciated, however, that the fixed and named properties may be stored in other locations such as in a separate database. The named properties include environmental variables that are utilized by the applications from the scenario 180. The message box 174 includes messages 176 associated with the user agent 147, each message 176 including at least one message component 178. The messages 176 may be voice mail messages, fax messages, e-mail messages, or any other message type supported by the CT server 10.

Figure 10B:
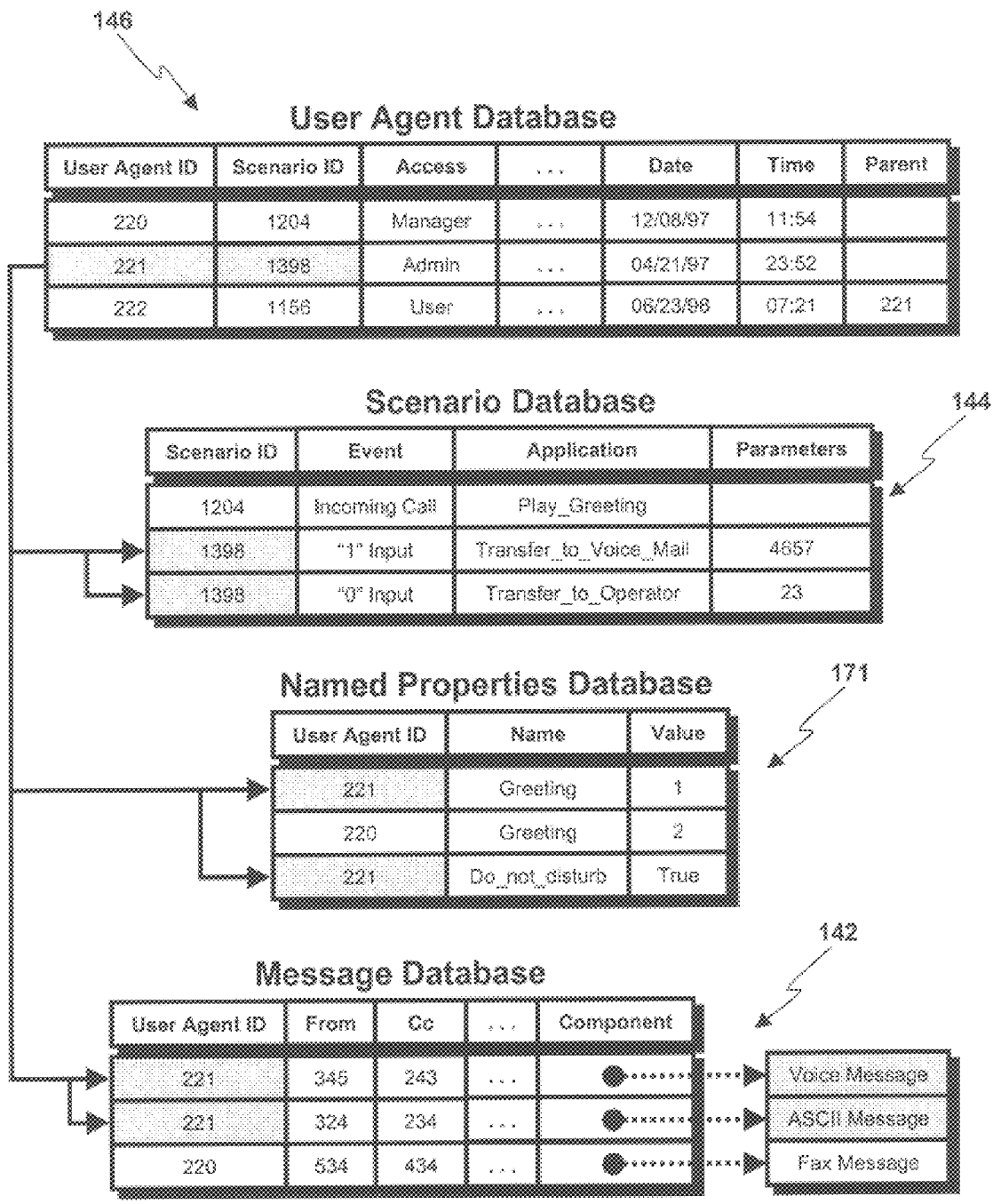
FIG. 10b illustrates a preferred database structure for the user agent.
Figure 10C:
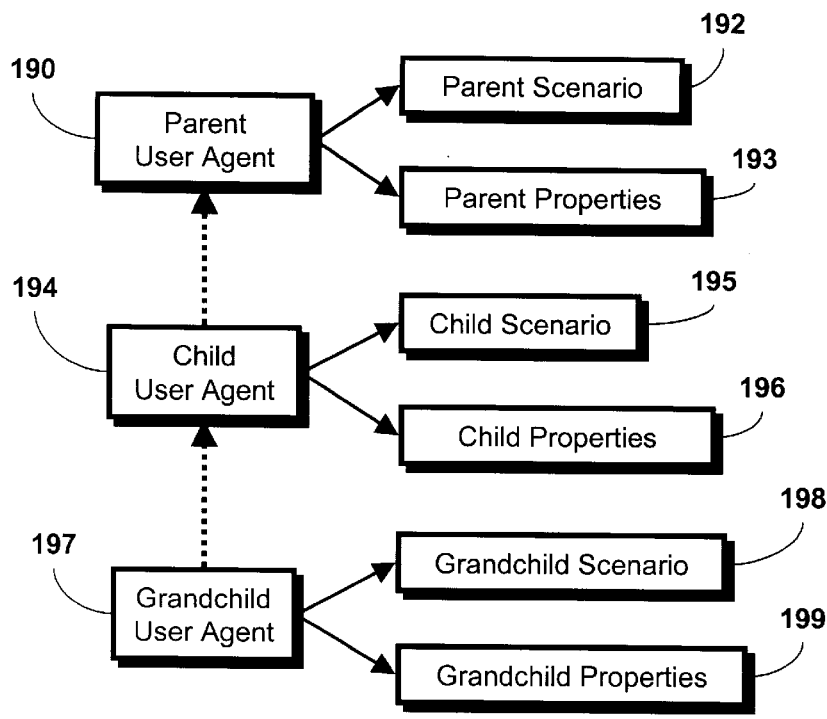
FIG. 10c is a block diagram illustrating a preferred embodiment of the inheritance of user agents.

A preferred embodiment of the database structures utilized by the user agent 147 is illustrated in FIG. 10b. The user agent database 146 includes one record for each user agent. Each record includes a field for a unique user agent ID, and a scenario ID to identify a scenario from the scenario database 144. In addition, the user agent database 146 includes fields for each of the fixed properties, for example, a field for storing a security access level, fields for storing the date and time that the user agent was last edited, and a field for storing the user agent ID of a parent user agent. Further, in accordance with the preferred embodiment the scenarios and user agents have a one-to-one relationship, with each scenario being linked to only one user agent record, and vice versa. The scenario database 144 includes one record for each event-application pair from each scenario, indexed by the scenario ID. Each record may also include one or more parameters used for customizing the behavior of the corresponding application.

A named properties database 171 is utilized to store the named properties for each user agent. The named properties are environmental variables that are used to customize the behavior of an application from the scenario corresponding to the scenario ID of the user agent. Each record in the named properties database includes a user agent ID corresponding to its respective user agent and a name/value pair. The name field stores the name of the environmental variable, and the value field represents the value to be stored in the environmental variable. When an application that uses an environmental variable is executed, it searches the named properties database 171 for a defined value in accordance with the user agent ID and the name of the variable. If no defined value exists, a default value will be used. In the preferred embodiment, the named properties are stored in the registry of the operating system; however, it should be appreciated that other storage methods may be utilized, such as a relational database.

An example of a named property is the environmental variable "greeting." An application that plays a greeting will check the value of the named property "greeting" for the corresponding user agent, and then play the greeting specified by the environmental variable. As illustrated in FIG. 10b, the user agent having the user agent ID "221" includes the named property of "greeting" having a value of "1." Thus, greeting #1 will be played when an application from a scenario having a scenario ID of "168" needs to play a greeting. If the named properties database 171 does not include an entry for "greeting" corresponding to user agent ID "221," then a default greeting will be played.

A message header database 142 is also provided to store information for each message. In the preferred embodiment, each record in the message header database 142 represents one message, and includes fields such as "To", "From," "Cc" and "Date," for storing general message information. In addition, the message header database 142 includes a list of message components corresponding to the message. The message components are stored as files separate from the message header database 142, and the records from the message header database 142 include pointers to the respective component files.

The user agent 147 is also capable of inheritance as illustrated by reference numeral 186 in FIG. 10a. A preferred embodiment of the feature of inheritance will now be described with reference to the block diagram of FIG. 10c. A parent user agent 190 includes a scenario 192 and a set of properties 193. The scenario 192 defines the call processing behavior of the parent user agent 190 and the properties 193 are used to customize the behavior of the applications defined in the scenario 192. In the preferred embodiment, the parent user agent 190 defines a default behavior of the CT server 10 for a certain group of users, e.g., a sales department.

A child user agent 194 includes its own scenario 195 and its own set of properties 196. The child user agent 194 will have the user agent ID of the parent user agent 190 stored in the "parent" field of the user agent database 146. When the child user agent 194 is created, the parent scenario 192 and parent properties 193 define the default call processing behavior of the child user agent 194. However, the child scenario 195 and the child properties 195 may be modified to override certain features of the parent user agent 190, or to add new features. The parent user agent 190 can be modified at any time, and the changes will automatically be inherited by the child user agent 190, unless previously overridden by the child user agent 190. The child user agent 194 may be an end user of CT server, e.g., a salesperson, or as discussed below, may define a default behavior of a subgroup of the parent user agent 190.

The parent user agent 190 of the preferred embodiment may have multiple child user agents 194. In addition, to preserve the default call processing behavior defined by a parent user agent, in the preferred embodiment only a childless user agent 147 may be deleted. The user agent 147 also supports a multilevel hierarchy. Thus, a grandchild user agent 197 may include a grandchild scenario 198 and a set of grandchild properties 199. The grandchild user agent 197 will have the user agent ID of the child user agent 194 stored in the "parent" field of the user agent database 146. The grandchild user agent 197 will inherit directly from the child user agent 194, which in turn inherits directly from the parent user agent 190.

Figure 10D:
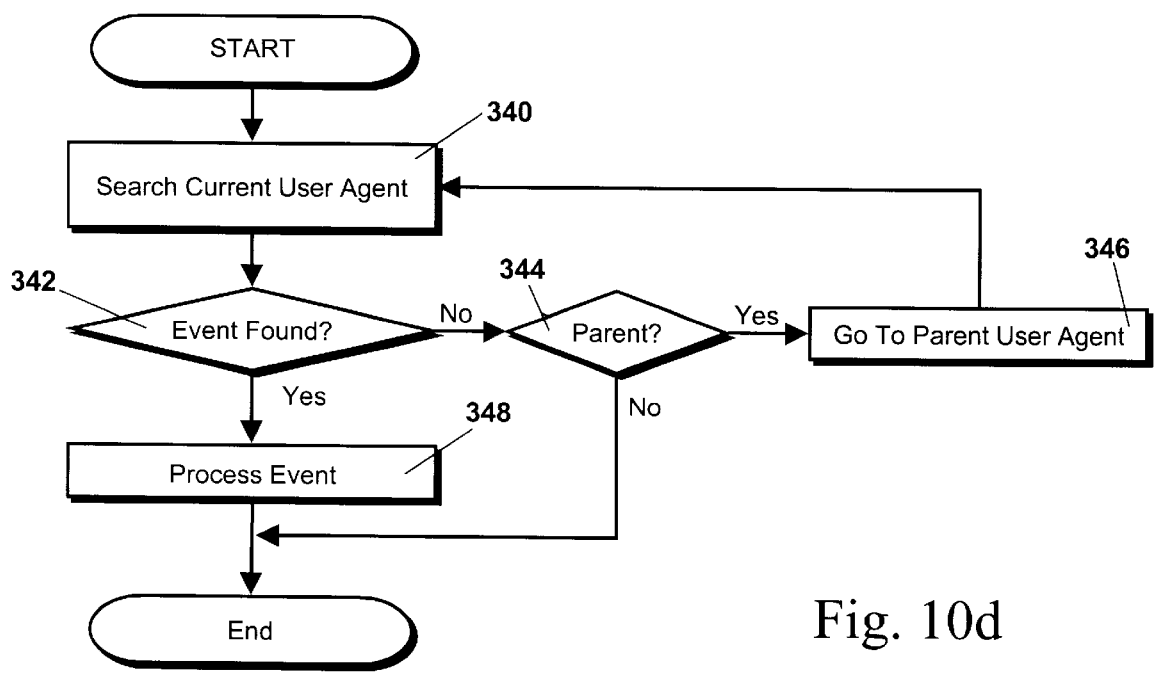
FIG. 10d is a flow diagram illustrating a preferred embodiment of the event processing of the user agents.

A preferred embodiment of the event processing of user agents will now be described with reference to the flow diagram of FIG. 10d. First, when an event is detected, the records in the scenario database corresponding to current user agent are searched at step 340. If the event is found in one or more records of the scenario database, then the applications corresponding to the event are processed at step 348. Thus, if the current user agent is a grandchild user agent, its scenario will override the default scenarios of its parent and grandparent. If the event is not found in the scenario database of the current user agent, then at step 344 the user agent database 146 is searched to determine whether the current user agent inherits a scenario from a parent user agent—i.e., if there is a user agent ID stored in the "parent" field. If the current user agent does not have a parent user agent, then the event is not processed. Otherwise, at step 346, the record for the parent user agent is located in the user agent database 146 and the logic returns to step 340 where the search for the event continues with the scenario from the parent user agent. The logic from FIG. 10d repeats until the detected event is found in the scenario database, or until there are no more parents to search. The inherited properties can be located in a similar manner.

It should be appreciated that the implementation of user agents 147 in the CT server framework 94 results in an architecture that is highly customizable, without requiring additional coding or recompilation of the software. As discussed above, the call processing behavior of a user agent 147 is defined by its scenario 180. The CT server framework 94 is an event-driven application framework, and the scenario 180 defines valid "events" that the user agent 147 will recognize and the corresponding applications to be executed when such valid events are detected. Because the scenario 180 is stored in a database, the scenario 180 (and thus the behavior of the CT server 10) can easily be changed during runtime by adding a new event/application record to the scenario database. In addition, the call processing behavior of the user agent 147 can be further customized by changing the values of the properties 172, which are environmental variables utilized by the applications of the scenario 180. New properties can also be added to the user agent 147 without recompiling the software, because these values are also stored in a database.

Sessions

Figure 11:
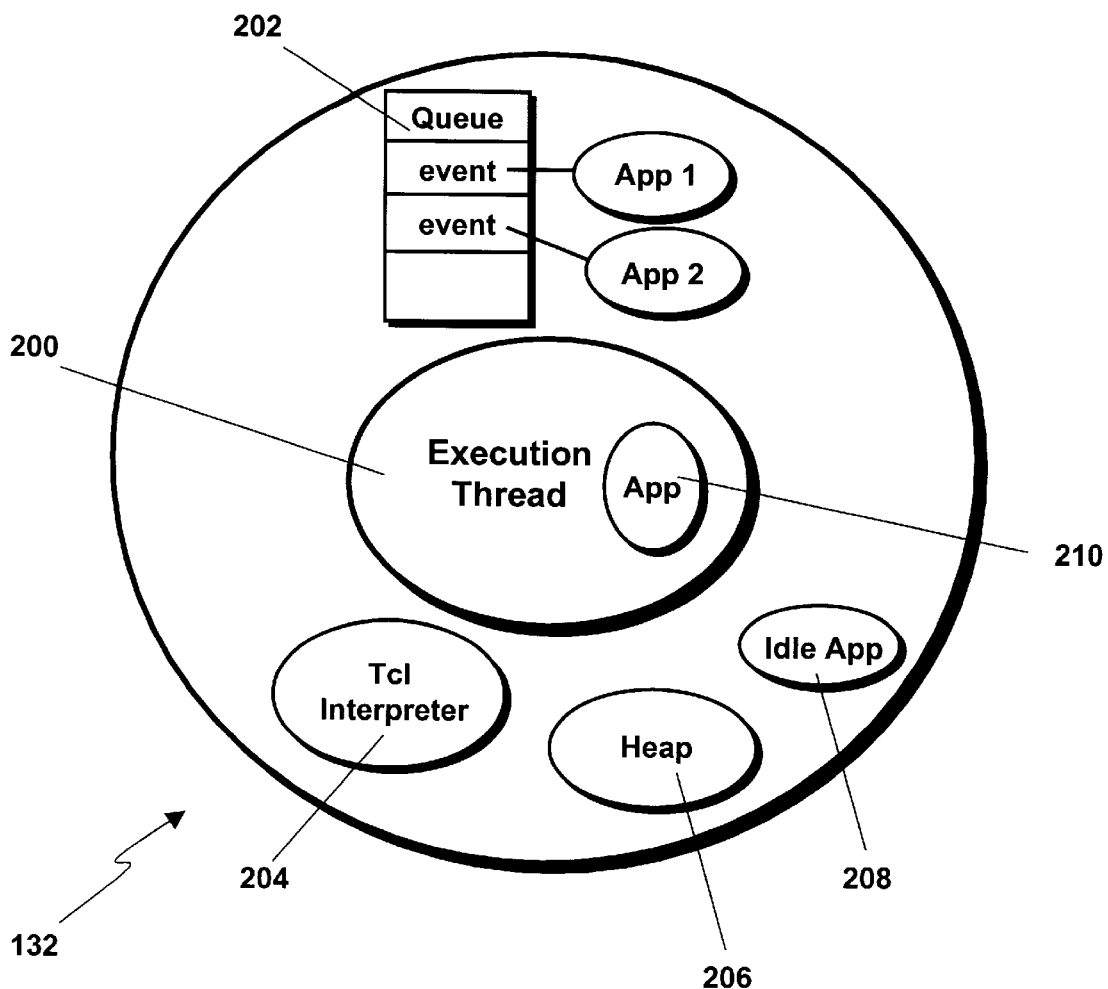
FIG. 11 is diagram illustrating the basic components of a session in a preferred embodiment.
Figure 12:
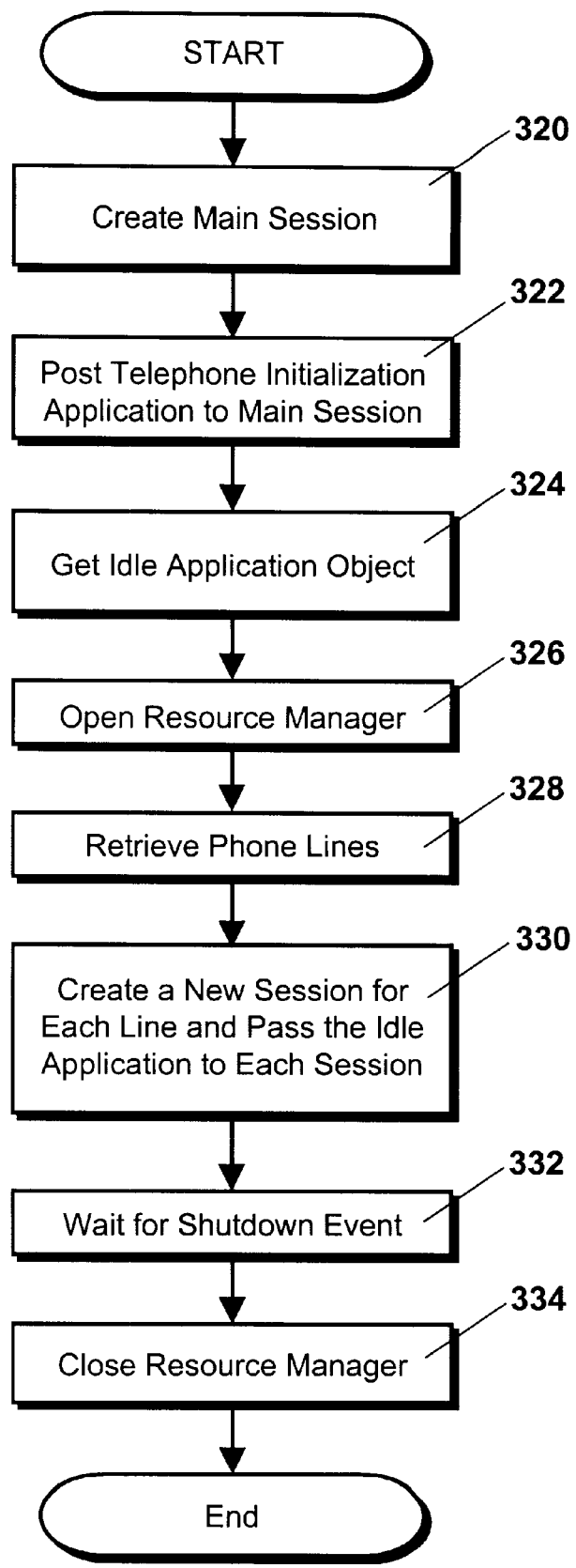
FIG. 12 is a flow chart illustrating the basic flow of a voice mail application in accordance with a preferred embodiment of the present invention.
Figure 13:
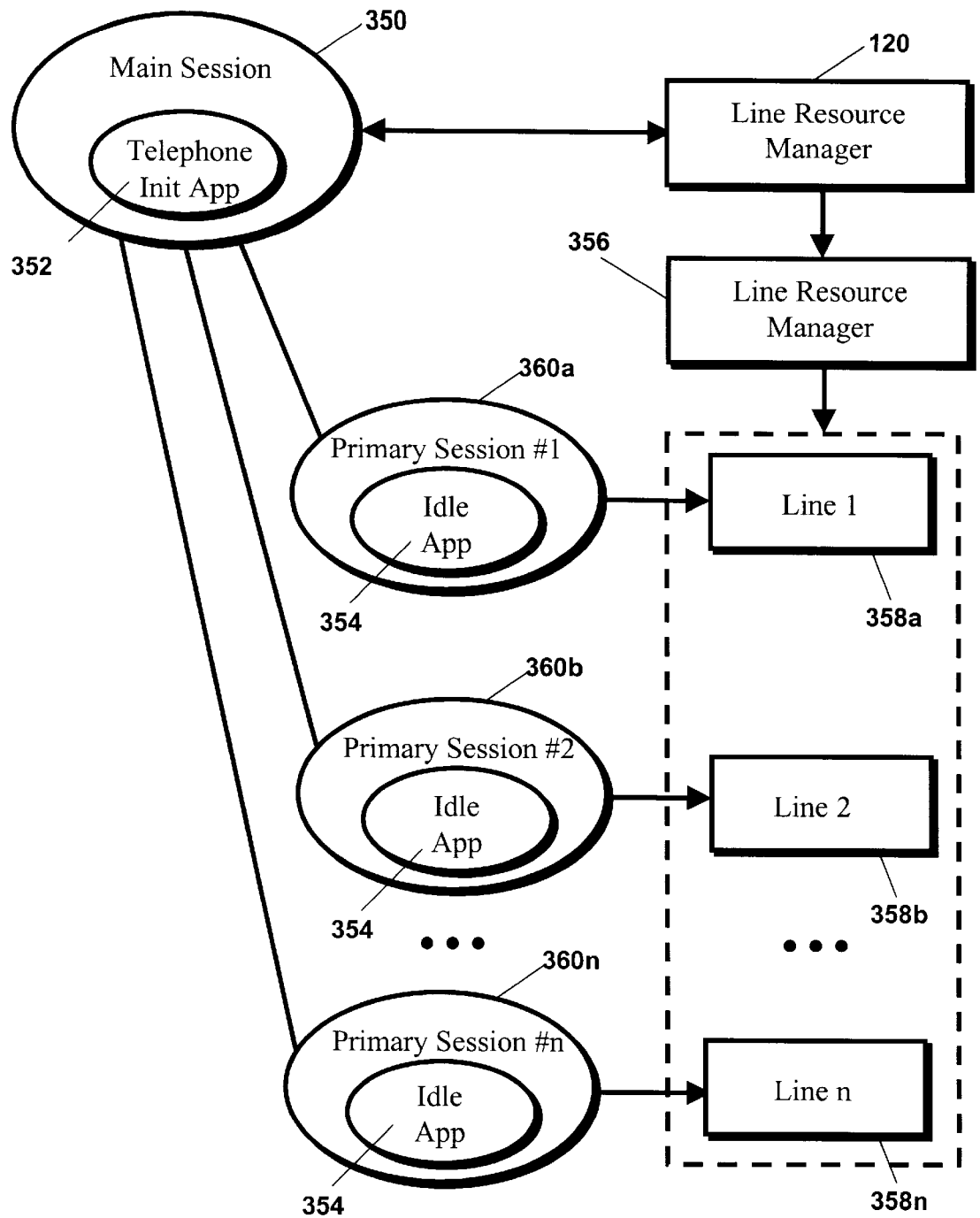
FIG. 13 is a diagram illustrating an example of the relationship between the main session, the primary sessions and line resources.
Figure 14:
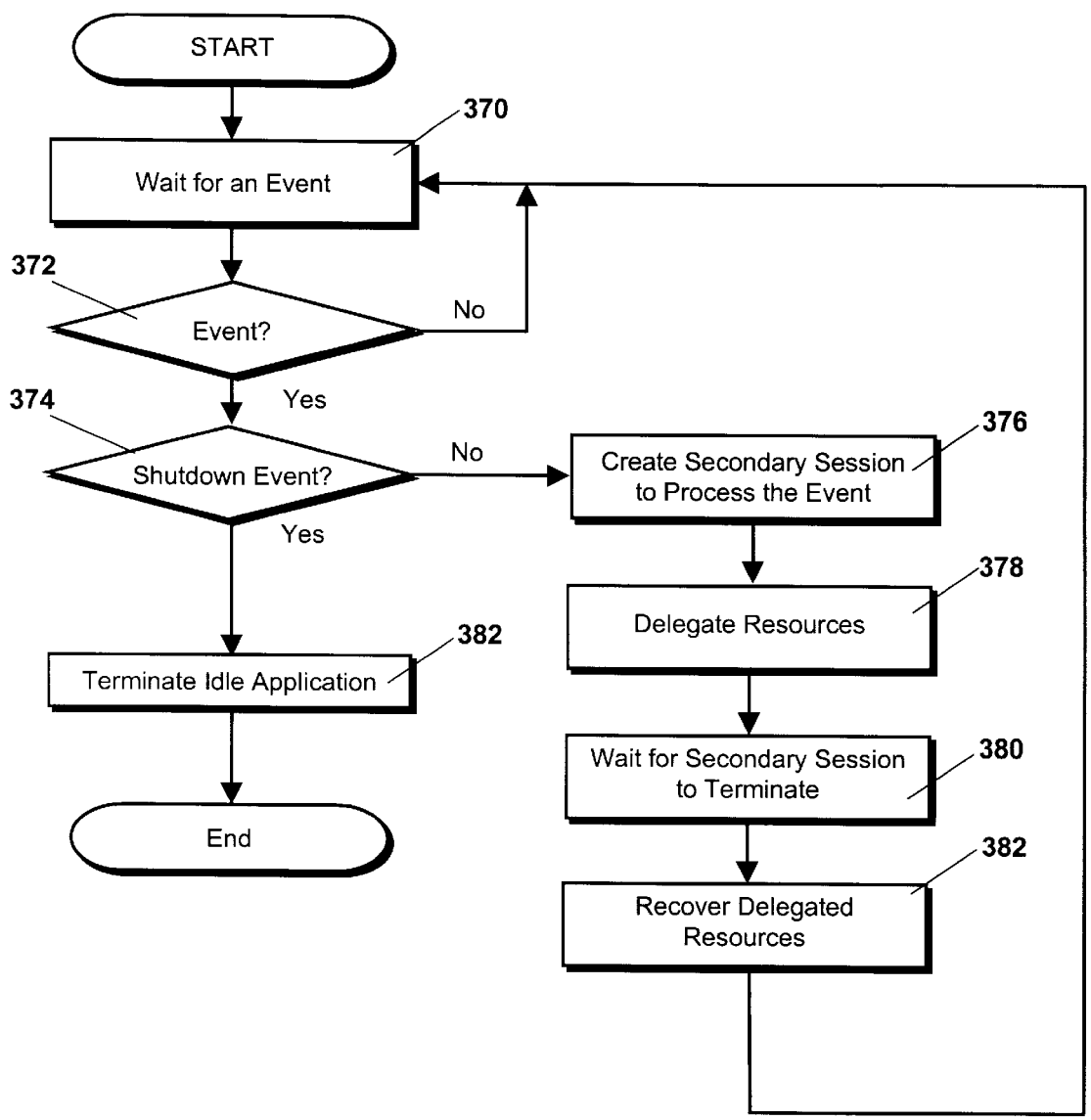
FIG. 14 is a flow chart illustrating the operation of an idle application in accordance with a preferred embodiment of the present invention.
Figure 15:
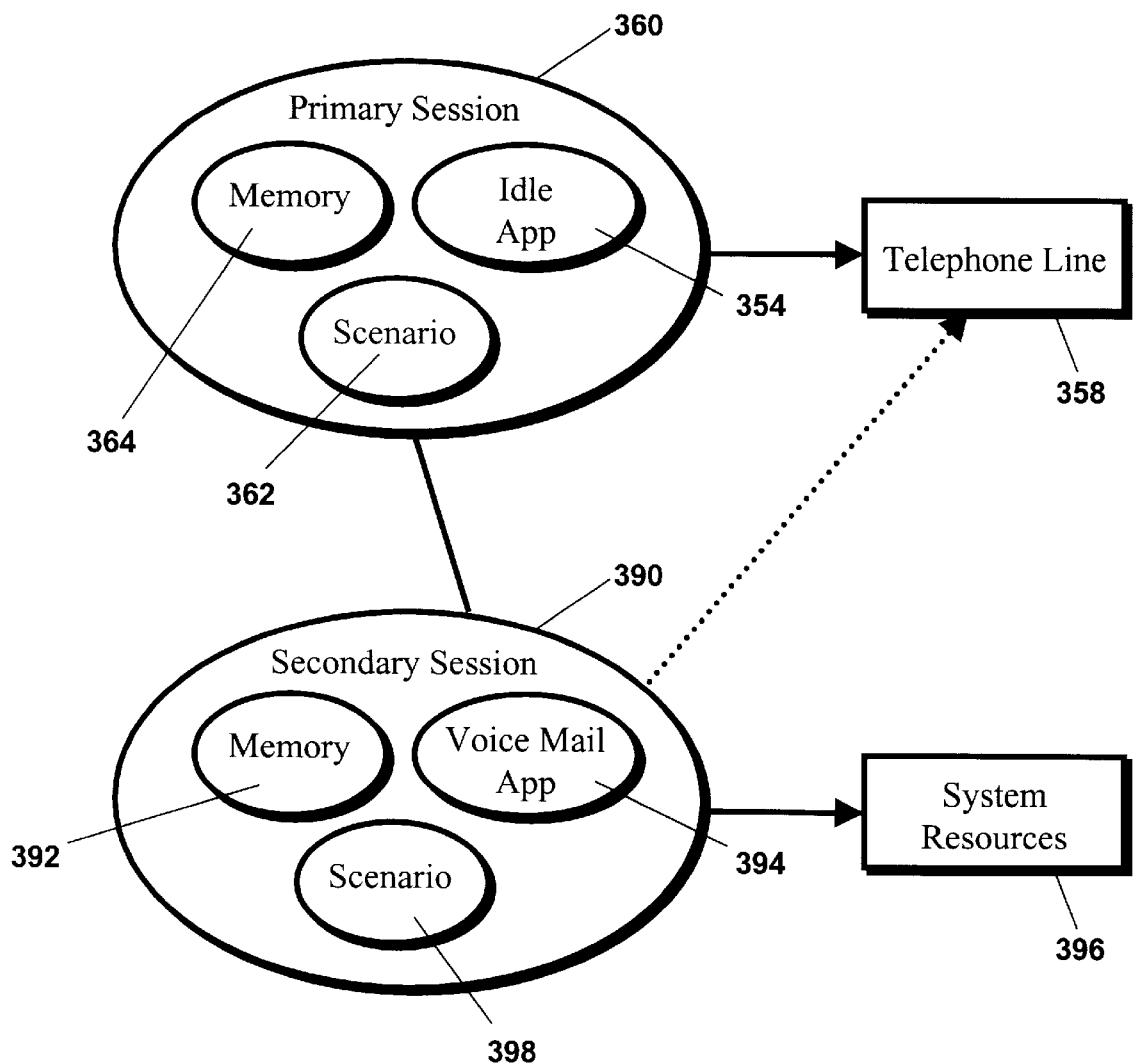
FIG. 15 is a diagram illustrating a primary and a secondary session of a preferred embodiment of the present invention.

Referring back to FIG. 4, after the global objects are created at step 306, a main session is created at Step 308 to provide a clean runtime environment for a main application, such as an initialization application, which is loaded and posted to the main session at Step 310. A "session" binds together an execution context and system resources. The components of a preferred embodiment of a session 132 are illustrated in FIG. 11. The execution context includes an execution thread 200 on the processor 52 and a heap 206 which is a subset of the memory 54. In addition, the session 132 includes a session queue 202, an application, such as an idle application 208, and a Tcl interpreter 204 to be used by the applications running on the session 132.

When the session 132 is created, the session queue 202 begins running. The session queue 202 can be used by other sessions to send messages into session 132. Initially, the session queue 202 waits for a message to arrive with an application to be executed on the session 132, and if one does not arrive within a predetermined time-out period, the session 132 exits. In the preferred embodiment, the main application locates the session application from the configuration manager 110 and sends this application to the session queue 202. The application is copied onto the heap 206 and will then be executed on the session 132. The application may utilize any resources allocated to the session 132, such as telephone lines, voice processing, fax processing, etc. The application will likely generate other events that will be posted to the session queue 202 to keep the session running. A user agent will usually be used by an application to calculate the next application to be executed in response to a given event. In addition, the session 132 provides exception handling for all applications that run on it. When an exception occurs, the session 132 shuts down the execution thread 200 and releases all resources allocated to the session 132.

In the preferred embodiment, the resources allocated to the session 132 will be released automatically whenever the session 132 terminates, e.g., through normal termination or if the application executing on the session 132 crashes. In addition, the session 132 can start another session (i.e., a child session), and may "delegate" the use of some or all of its resources to this second session. The second session may utilize the delegated resources as if the resources had been allocated to the second session. However, in the preferred embodiment, the second session can release resources allocated to the second session, but cannot release delegated resources (i.e., those resources allocated to other sessions). When the second session terminates, the session 132 will regain control of the resources it delegated to the second session.

Referring back to FIG. 4, after the main application is posted to the main session, the CT framework application then waits for the main session to end at Step 312. When the main session ends, the CT framework application frees all system objects at Step 314 and executes all applications marked "shutdown" in the registry at step 316, to shutdown the CT server 10.

An example of the operation of a voice mail application running on the CT server 10 will now be illustrated with reference to FIGS. 12–15. Although a voice mail application is illustrated, It should be apparent that other applications can also be run on the CT server 10. The basic implementation of a voice mail application is provided in the flow diagram of FIG. 12 with reference to the block diagram of FIG. 13. First, a main session 350 is created at step 320 by the CT server framework. At step 322, the application name of a telephone initialization application 352 is read from the configuration manager and sent to the session queue of session 350 where it is executed on the execution thread of main session 350. The telephone initialization application 352 retrieves an idle application 354 from the configuration manager at step 324.

At step 326, the resource manager 120 is contacted, and a specific resource manager 356, for managing a plurality of telephone lines, is opened. The telephone initialization application 352 then retrieves the number of telephone lines 358a–n available from the resource manager 120 at step 328. A plurality of primary sessions 360a–n are created, one for each telephone line, and the idle application 354 is passed as a message into each primary session 360a–n. When the idle application 354 is received in one of the primary sessions 360a–n, it will execute the idle application 354 which causes the primary session 360 to wait for an event to occur on its respective telephone line 358. Next, the telephone initialization application 352 running on the main session 350 waits for a shutdown event to be signaled at step 332. When a shutdown event occurs, the resource manager 120 sends a line shutdown event to all telephone lines 358a–n causing all idle applications 354 to stop executing. The resource manager 120 will then wait for all telephone lines 358a–n to be released by their respective primary sessions 360a–n or it will take control of the line after a predetermined amount of time. When each idle application 354 stops executing, its respective primary session 360 terminates.

Operation of the idle application 354 will now be described with reference to FIGS. 14–16b. As discussed above, when a telephone line resource 358 is allocated to the primary session 360, the idle application 354 is sent to the primary session 360 and is executed on the primary session's thread. If the telephone line resource 358 is not available from the resource manager, an error is written to an event log and the application ends. If the telephone line resource 358 is available, the idle application 354 marks the telephone line 358 as "inheritable," thereby allowing the telephone line resource 358 to be utilized by a child session, and registers the telephone line 358 with the job queue. An interrupt mask is set to wake up when a job or shutdown event is received by the telephone line 358. At step 370, the idle application 354 waits for an event to occur in accordance with a scenario 362, such as an incoming call. As discussed above, the scenario 362 includes a plurality of events, each of which is mapped to one of a plurality of applications. When an event occurs, and it is a shutdown event (steps 372 and 374) the idle application terminates at step 382.

When an event occurs and it is not a shutdown event, the idle application 354 launches a secondary session 390 at step 376 in which the event will be processed. Before creating the secondary session, the idle application 354 locates a default user agent 397 from the configuration manager, creates an application object based on the configuration of the line, and inserts the default user agent 397 into the application object's data structure. The default user agent 397 includes a scenario 398 which will be used to define the call processing behavior of the secondary session 390. The idle application 354 then creates the secondary session 390 at step 378. At step 380, the idle application 354 delegates the telephone line 358 to the secondary session 390, and sends a message to the secondary session 390 including the application object. Once created, the secondary session 390 waits for the message, receives the application, such as a voice mail application 394, and executes it. When it is done, it waits for another message, and if none is received, it terminates at step 380. Next, the idle application 354 recovers the delegated telephone line resource 358 used by the secondary session 390 at step 382, and then waits for the next event to occur.

As should be apparent, the idle application 354 operates to ensure that the primary session 360 regains control of the telephone line 358 and any other resources delegated to the secondary session 390. When the secondary session 390 terminates, it releases its memory 392 and any other system resources 396 allocated to the secondary session 390. However, as discussed above, the secondary session 390 cannot release resources that were delegated from other sessions, such as the telephone line 358 which was delegated to the secondary session 390 by the primary session 360. When the primary session 360 terminates, it will release the telephone line 358, as well as its memory 364.

Because the idle application only performs a few simple functions (e.g., wait for an event, launch second session, cleanup after second session, shutdown) the code needed to create the idle application will be relatively small and relatively easy to debug; thus, a person of ordinary skill in the art can write an idle application that will release its own system resources. In addition, because the idle application is the only application that executes on the primary session, the primary session is not exposed to the danger of executing an untested, incompatible, or otherwise unstable application that could cause the system to become unstable. Thus, cleanup of the resources delegated to the secondary session is virtually guaranteed.

Figure 16A:
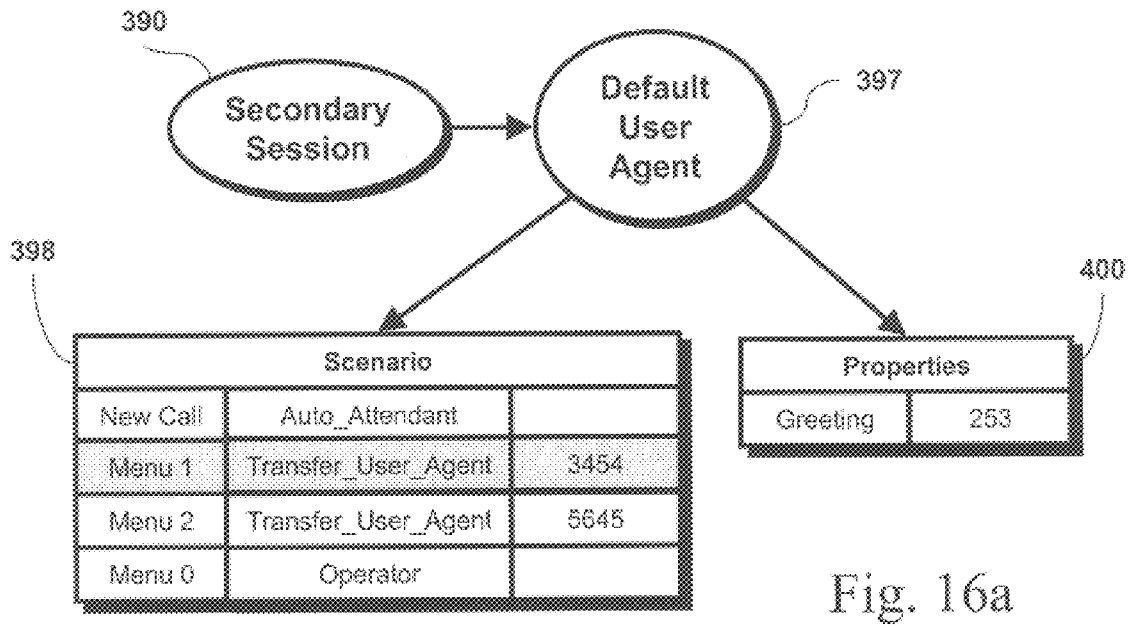
FIGS. 16a–b are diagrams illustrating an example of the use of user agents, scenarios, properties and sessions.
Figure 16B:
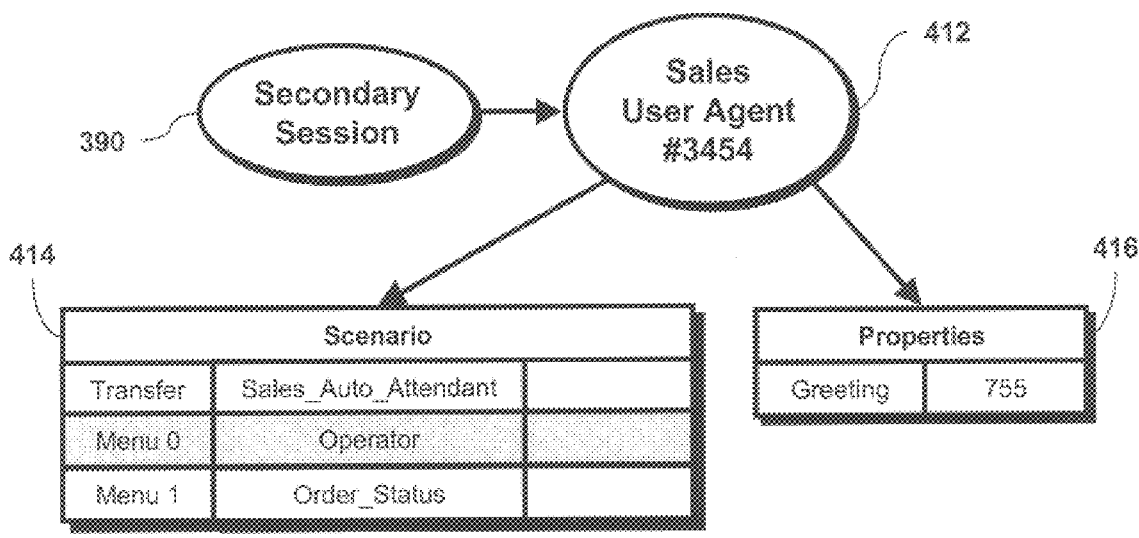

As discussed above, the behavior of the secondary session 390 is defined by its associated user agent. An example illustrating how the secondary session 390 may handle an incoming call is illustrated in FIGS. 16*a* and 16*b*. The behavior of the secondary session 390 is initially defined by the default user agent 397, which includes the scenario 398 and a properties list 400. According to the scenario 398, when a "new call" event is detected (i.e., a telephone call is received), an Auto_Attendant application is executed. The Auto_Attendant application plays greeting #253 as specified by the properties 400, and presents the caller with a list of options from which the caller can select by pressing a button on the caller's telephone. For example, the caller may have the option of selecting: "0" to speak to an operator; "1" to transfer to the sales department; or "2" to transfer to the customer support department.

If the caller presses "1," the caller will be transferred to the sales department. Because the sales department may require its own call processing behavior, a sales user agent 412 is provided, and includes a sales scenario 414 and a sales property list 416. In a preferred embodiment, a transfer application is executed to switch the call processing behavior of the secondary session 390 from the default user agent 397 to the sales user agent 412. Thus, when the caller presses "1," the transfer application Transfer_User _Agent is executed along with the parameter "3454," which specifies the user agent ID of the sales user agent 412. This transfer application first generates a "transfer" event on the sales user agent 412, and the sales user agent 412 returns the application Sales_Auto_Attendant associated with the transfer event in the scenario 414. Next, the application Sales_Auto_Attendant is posted to the session queue of the secondary session 390, along with the sales user agent 412. When the transfer application Transfer_User_Agent terminates, the secondary session 390 retrieves the Sales_Auto_Attendant application (i.e., the next application in the session queue) from the session queue and executes the Sales_Auto_Attendant application in accordance with the sales user agent 412. As illustrated in FIG. 16*b*, the Sales_Auto_Attendant application plays greeting #755 as specified by the sales properties list 416, and presents the caller with a new list of menu options. If the caller selects "0," the call is transferred to an operator in the sales department who may then answer the call.

Having thus described a preferred embodiment of the Software Architecture for a Computer Telephony System, it should be apparent to those skilled in the art that certain advantages of the within system have been achieved. It should also be appreciated that numerous modifications, adaptations, and alternative embodiments thereof may be made within the scope and spirit of the present invention. The above description is presently the best contemplated mode of carrying out the invention. This illustration is made for the purpose of illustrating the general principles of the invention, and is not to be taken in a limiting sense. The scope of the invention is best determined by reference to the following claims.

What is claimed is:

1. In a computer telephony system for providing integrated telephone and data applications, the computer telephony system including a computer having a processor and a memory, a software architecture implemented on the computer comprising:

a plurality of user agents, each user agent representing a known user of the computer telephony system and including:

a scenario defining a call processing behavior of the user agent; and a set of properties for customizing the call processing behavior defined by the scenario; and a plurality of sessions, each session including a thread of execution on the processor and controlling a subset of the memory and at least one system resource, wherein each session implements one of the plurality of user agents, the one of the plurality of user agents defining the call processing behavior of its associated session in accordance with its corresponding scenario and set of properties, and wherein the scenario and the set of properties for each user agent are configurable during runtime of the software architecture, thereby allowing the call processing behavior the computer telephony system to be modified for each of the known users.

2. The software architecture of claim 1 wherein each of the plurality of sessions is operable to detect a call processing event relating to the at least one system resource.

3. The software architecture of claim 2 wherein the scenario includes a plurality of event-application pairs, each pair representing an event that may be processed by a session implemented the user agent associated with the scenario and a corresponding application that is to be executed when the event is detected.

4. The software architecture of claim 3 wherein the set of properties includes fixed properties for customizing standard features of each user agent and named properties for customizing the behavior of the applications from its corresponding scenario.

5. The software architecture of claim 4 wherein the named properties include name-value pairs, each pair representing the name of an environmental variable utilized by at least one application in the corresponding scenario and its associated value.

6. The software architecture of claim 5 wherein the scenario and the set of properties are inheritable from a parent user agent to a child user agent, such that changes made to the parent user agent may be immediately inherited by the child user agent during runtime.

7. The software architecture of claim 6 wherein the child user agent is permitted to override features of its parent user agent, including individual event-application pairs from the parent user agent's scenario and individual name-value pairs from the parent user agent's set of properties, and wherein the child user agent may add new event-application pairs and new name-value pairs in addition to those stored in the parent user agent's scenario and set of properties.

8. The software architecture of claim 7 wherein the parent user agent is associated with a plurality of child user agents.

9. The software architecture of claim 8 wherein the scenario of at least one user agent includes an event-application pair such that on the occurrence of the event, a session on which the user agent is implemented, exchanges the user agent for a second user agent.

10. The software architecture of claim 9 further comprising a plurality of global objects including a database manager for managing a user agent database and a scenario database, wherein the user agent database includes one database record for each of the plurality of user agents and the scenario database includes one record for each event-application pair associated with a given user agent.

11. The software architecture of claim 10 wherein each user agent further includes:

a message box for storing a plurality of messages associated with the user agent, each of the plurality of messages including a message header and at least one message component.

12. A computer telephony server for simultaneously implementing a plurality of messaging applications, the computer telephony server being connected to a plurality of telephone line resources, the computer telephony server comprising:

a processor;

a memory;

a session, including a thread of execution on the processor and controlling a subset of the memory and one of the plurality of telephone line resources;

a first user agent representing a known user of the computer telephony server, including:

a first scenario defining a call processing behavior of the first user agent; and a first set of properties for customizing the call processing behavior defined by the first scenario, wherein the first user agent is implemented on the session and defines the call processing behavior of the session in accordance with the first scenario and the first set of properties, and wherein the first scenario and the first set of properties can be modified during runtime of the computer telephony server, thereby allowing the call processing behavior of the computer telephony server to be configured for the known user.

13. The computer telephony server of claim 12 wherein the session is adapted to detect a call processing event relating to the telephone line resource, and wherein the scenario includes a plurality of event-application pairs, each pair representing a valid event that may be processed by the session and a corresponding application that is executed when the valid event is detected.

14. The computer telephony server of claim 13 wherein the set of properties includes fixed properties for customizing standard features of the first user agent and named properties for customizing the behavior of the applications from the first scenario, and wherein the named properties include name-value pairs, each pair representing the name of an environmental variable utilized by at least one application in the first scenario and its associated value.

15. The computer telephony server of claim 12 further including:

a parent user agent, representing a group of users of the computer telephony server, including:

a parent scenario defining a default call processing behavior for the group of users; and a parent set of properties including default values to customize the call processing behavior defined by the parent scenario for the group of users, wherein the parent scenario and the parent set of properties are inheritable by at least one child user agent representing a known user of the computer telephony server, such that changes made to the parent user agent are immediately inherited by the child user agent during runtime, and wherein the first user agent is a child user agent.

16. The computer telephony server of claim 15 wherein the at least one child user agent is permitted to override features of the parent user agent, including individual event-application pairs from the parent scenario and individual name-value pairs from the parent set of properties.

17. The computer telephony server of claim 12 further comprising a second user agent including:

a second scenario defining a call processing behavior of the second user agent; and a second set of properties for customizing the call processing behavior defined by the second scenario;

wherein the first scenario includes at least one transfer event-application pair such that, when the transfer event is detected in the session, the transfer application is executed and operates to implement the second user agent on the session in place of the first user agent.

18. A computer telephony server for simultaneously implementing a plurality of messaging applications, the computer telephony server being connected to a plurality of telephone line resources, the computer telephony server comprising:

a processor;

a memory;

a session, including a thread of execution on the processor and controlling a subset of the memory and one of the plurality of telephone line resources; and a first user agent representing a known user of the computer telephony server, including:
  a first scenario including a plurality of event-application pairs, each pair representing a valid event and a corresponding application that is executed when the valid event is detected, whereby the first scenario defines a call processing behavior of the first user agent; and
  a first set of properties for customizing the call processing behavior defined by the first scenario, the first set of properties including fixed properties for customizing standard features of the first user agent and named properties for customizing the behavior of the applications from the first scenario, wherein the named properties include name-value pairs, each pair representing the name of an environmental variable utilized by at least one application in the first scenario and its associated value, wherein the first user agent is implemented on the session and defines the call processing behavior of the session in accordance with the event-application pairs of the first scenario and the first set of properties, and wherein the first scenario and the first set of properties can be altered during runtime of the computer telephony server, thereby allowing the call processing behavior of the computer telephony server to be changed.

19. The computer telephony server of claim 1 further including:

a parent user agent, representing a group of users of the computer telephony server, including:
  a parent scenario defining a default call processing behavior for the group of users; and
  a parent set of properties including default values to customize the call processing behavior defined by the parent scenario for the group of users, wherein the parent scenario and the parent set of properties are inheritable by at least one child user agent representing a known user of the computer telephony server, such that changes made to the parent user agent are immediately inherited by the child user agent during runtime, wherein the at least one child user agent is permitted to override features of the parent user agent, including individual event-application pairs from the parent scenario and individual name-value pairs from the parent set of properties, and wherein the first user agent is a child user agent.

20. A method for operating a computer telephony system including a computer having a processor and a memory, and at least one telephone line resource, the method comprising the steps of:

creating a first user agent including a first scenario having a first plurality of event-application pairs defining a first call processing behavior of the first user agent and a first set of properties for customizing the call processing behavior defined by the first scenario;

creating a session, including a thread of execution on the processor and controlling a subset of the memory and the at least one telephone line resource;

implementing the first user agent on the session, such that the first user agent defines an event-driven call processing behavior of the session;

detecting a call processing event on the session; and searching the first scenario for each event-application pair corresponding to the detected event and, if the detected event is found in the first scenario, executing the corresponding applications.

21. The method of claim 20 further comprising the steps of:

creating a parent user agent including a parent scenario having a second plurality of event-application pairs defining a parent call processing behavior and a parent set of properties, wherein the first user agent inherits the parent scenario and the parent set of properties;

configuring the first scenario and first set of properties to override certain of the second plurality of event-application pairs and certain of the parent set of properties such that the call processing behavior defined by the first user agent differs from the call processing behavior defined by the parent user agent.

22. The method of claim 20 wherein the first plurality of event-application pairs further includes a transfer event and a corresponding transfer application, wherein the step of creating further includes creating a second user agent including a second scenario having a second plurality of event-application pairs defining a second call processing behavior and a second set of properties, and wherein, when the detected event is the transfer event, the transfer application is executed and operates to implement the second user agent on the session in place of the first user agent.

* * * * *